Aug. 19, 1952     D. H. KEISER, JR     2,607,114
PIVOTAL CONNECTION FOR SHEARS
Filed Nov. 9, 1949
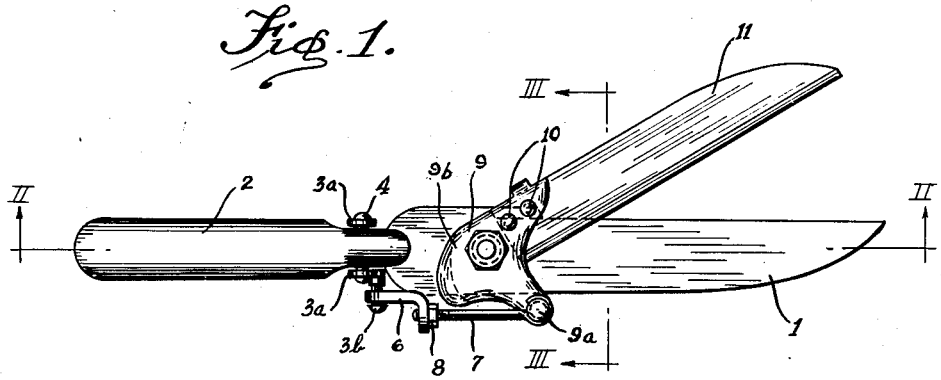
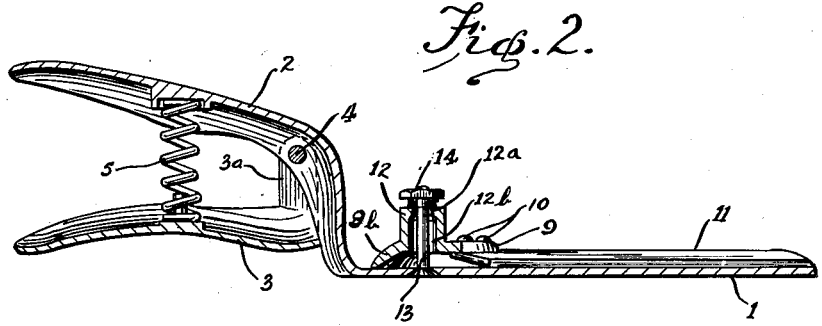
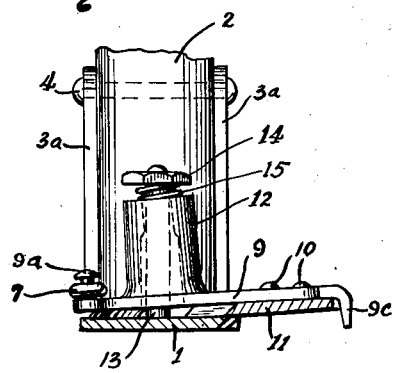
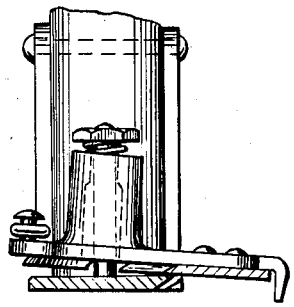
INVENTOR.
David Howard Keiser Jr.
BY
Attorney Patented Aug. 19, 1952

2,607,114

UNITED STATES PATENT OFFICE 2,607,114

PIVOTAL CONNECTION FOR SHEARS

David H. Keiser, Jr., West Lawn, Pa.

Application November 9, 1949, Serial No. 126,426

1 Claim. (Cl. 30—248)

My invention relates generally to shears and, more specifically, to improvements particularly applicable to the type of shears shown in my prior Patent No. 2,281,977 dated May 5, 1942. My invention is directed to the type of shears commonly known as clipper grass shears in which one cutting blade is fixed and the other is movable—and my improvements relate more specifically to a nonbinding pivotal connection between the shears for insuring a proper cooperating pressure engagement of the blade cutting edges during their closing movement to provide a clean cut and to prevent binding and clogging of the blades.

An outstanding disadvantage of most of the conventional types of shears is that there is a great tendency for the cutting edges of the blades to separate when they are brought together in contact with the goods to be cut and to be clogged with uncut material, therefore not forming a clean cut or shearing action. While attempts have been made to overcome this tendency, and to bring the blades close together when brought in contact with the grass or other material being cut, these attempts have not generally met with success and in most instances have resulted in very complicated and expensive constructions.

An object of my invention is to provide a pair of shears which embodies a relatively simple and inexpensive construction for providing easy and effective cutting action with a more positive and longer wearing pivotal connection having a minimum of friction.

A more specific object of this invention is to provide a novel clipper grass shears construction which enables the movable blade to be slightly rocked when engaged with the material to be cut, thereby bringing its cutting edge in close engagement with that of the stationary blade throughout their entire lengths to form a clean cut or shearing action, which rocking movement of the movable blade is caused by the resistance of the grass or other material being cut.

Other objects and advantages of my invention will become apparent from a study of the following specification, taken with the accompanying drawing wherein:

Fig. 1 is a top view of a pair of clipper grass shears embodying the principles of my invention;

Fig. 2 is a longitudinal sectional view taken along line II—II of Fig. 1;

Fig. 3 is an enlarged transverse cross-sectional view taken along line III—III of Fig. 1 showing the lateral tilting of the movable blade during the blade closing movements, and Fig. 4 is a transverse cross-sectional view identical to Fig. 3 but showing the free movement of the blades during their opening movements.

Referring more particularly to the figures, numeral 1 denotes a stationary blade having integrally formed at one end thereof a handle 2. A cooperating handle 3 has integral upstanding ears 3a with apertures at the end portions thereof through which extends a pin 4 for pivotally mounting handle 3 with respect to handle 2. A helical spring 5 is provided between handles 2 and 3 to bias them apart.

A pivot stud 3b is integrally formed on and projects from one side of handle 3 to form a pivotal connection with an angle bracket 6, the other end of which bracket is connected to the threaded shank portion of link 7 fastened to the bracket 6 in any adjustable position by means of a nut 8. The other end of the link 7 has an eye portion which encompasses a pivot stud 9a integrally formed on the blade carrying plate 9. Plate 9 is rigidly secured such as by means of rivets 10 or other suitable fastening means to a movable blade 11.

Integrally formed on plate 9 is a boss 12 whose upper opening 12a is of smaller diameter than its lower opening 12b. A pivot post 13 has its lower end rigidly fixed to stationary blade 1 and its upper end extending through and slightly spaced from opening 12a so as to permit a slight rocking or tilting movement of the boss with respect to the post. A nut 14 is screw threaded to the top of the post for holding the posts in assembled position. The nut is not tightly screwed onto boss 12 but, instead, a spring 15 is preferably interposed between the nut and boss as shown, which properly tensions the boss against too free movement while permitting its tilting as desired.

In operation, the movable blade 11 is moved towards fixed blade 1 by compressing handle members 2 and 3 resisted by the compression of spring 5. The pivotal movement of handle 3 about pin 4 will cause a pull on angle bracket 6 and link 7. And by virtue of the pivotal connection of link 7 to the blade carrying plate 9, movable blade 11 is rotated loosely about post 13 as an axis. As the result of resistance offered by grass or other material being cut, movable blade 11 would have a tendency to lift away from blade 1 about post 13 as a pivot were it not for the rearward extension 9b on blade carrier 9, which extension slidably engages the rear top surface portion of the fixed blade 1. In order to reduce friction on such rear top surface portion, the bottom surface of extension 9b is hollowed out so that only a pointed rear edge engages the top of blade 1. An extension 9c serves as a stop member for limiting the closing movement of the movable blade. Due to the relatively loose fit of boss 12 with respect to the post 13 and, more particularly, to the larger diameter of the well therein adjacent the lower portion of the post, and further due to the fact that the pulling action by link 7 on blade carrier 9 occurs along the base of the boss 12, the grass or other material being cut will offer such resistance as to form a pivot upon which movable blade 11 will cant or tilt laterally in a direction so that its cutting edge will come into very close engagement with the corresponding cutting edge of the fixed blade. This will be more apparent from a comparison of Fig. 3 and Fig. 4, the former showing the blade in the tilted position during the cutting operation and the latter showing the movable blade in a reversely tilted position as the blades are being spread apart by the action of spring 5. The loose pivotal connection therefore permits substantially frictionless movement of blade 11 in both directions so as to reduce the force necessary to operate the shears. As the blades are moved together and movable blade 11 is tilted or canted laterally, cooperative pressure engagement of the blade cutting edges is effected to cause a clean cutting action, with relief of such pressure during opening movements thereby reducing wear and preventing binding and clogging of the blades.

While the preferred type of shears shown in the drawing has handles operating in a plane perpendicular to the horizontal plane of movement of the blades, this is not essential, and any other known suitable operating means may be used, the present invention relating essentially to the novel pivotal connection of the blades and the resulting improved cutting action.

Thus it will be seen that I have provided an efficient pair of shears especially useful for cutting grass, trimming lawns, hedges and the like, which is of such construction as to be easy to operate and which will provide very effective cutting action with a minimum amount of friction, with practically no tendency for the material being cut to be caught or clogged between the blades.

While I have illustrated and described a certain specific embodiment of my invention, it will be understood that this is by way of illustration only, and that various changes and modifications may be made within the contemplation of my invention and within the scope of the following claim.

I claim:

Grass shears comprising a pair of pivotally connected blade means, a loose pivotal connection therefor comprising a boss integrally formed on and extending vertically outwardly from the plane of one of said blade means, a pivot bolt extending through both of said blade means and through said boss, said boss being substantially cup-shaped and spaced radially from the bolt throughout the major portion of the height of the boss and terminating at its other end in a radially inwardly extending bearing portion closely fitted about the bolt with a hole considerably smaller than the base forming mouth portion of the boss whereby the boss can be tilted relative to said bolt about said bearing portion as a pivot, said bolt having a cap part at the end thereof overlying said bearing portion of the boss, said base forming mouth portion of said boss terminating at its lower edge in substantially the same plane as the blade means it is integral with, said relationship providing pivotal sliding movement of said one blade means with the other blade means and the lower edge of said mouth forming portion having an arcuate rearwardly extending extension which is pivotally slidable on said other of said blade means and which prevents said one of said blade means from pivotal separation from said other blade means in a longitudinal plane at right angles to the plane of said blades, a pair of pivotally connected handles for pivotally moving said blade means, spring means mounted between said handles for normally spreading said handles apart, said one of said blade means having an extension projecting laterally of its blade, an operating link having one end pivotally mounted on said extension and the other end pivotally mounted on one of said handles, said link being movable in a plane extending rearwardly of and substantially parallel to said bearing forming portion of said boss, whereby as the handles are operated to pull said operating link, said last mentioned blade means will cant to effect close engagement of the cutting edges of the blades of said blade means throughout their shearing movements; a stop forming extension integrally formed on one of said blade means and engageable with the other of said blade means to limit closing movement of the blade means, and a helical spring surrounding said pivot bolt and normally biasing said blade means into engagement.

DAVID H. KEISER, Jr.

REFERENCES CITED

The following references are of record in the file of this patent:

UNITED STATES PATENTS

| Number | Name | Date |
|---|---|---|
| 1,727,067 | Keefe | Sept. 3, 1929 |
| 2,033,216 | Whyte | Mar. 10, 1936 |
| 2,281,977 | Keiser | May 5, 1942 |
| 2,306,506 | Simonsen | Dec. 29, 1942 |